US011393117B2

(12) United States Patent
Mosher

(10) Patent No.: US 11,393,117 B2
(45) Date of Patent: Jul. 19, 2022

(54) SEE-AND-AVOID SENSOR

(71) Applicant: Aaron Yi Mosher, Huntsville, AL (US)

(72) Inventor: Aaron Yi Mosher, Huntsville, AL (US)

(73) Assignee: Utah State University Space Dynamics Laboratory, North Logan, UT (US)

( * ) Notice: Subject to any disclaimer, the term of this patent is extended or adjusted under 35 U.S.C. 154(b) by 63 days.

(21) Appl. No.: 17/009,489

(22) Filed: Sep. 1, 2020

(65) Prior Publication Data

US 2022/0067952 A1   Mar. 3, 2022

(51) Int. Cl.
  *G06K 9/00*   (2022.01)
  *G06T 7/593*  (2017.01)
  *G06T 7/536*  (2017.01)

(52) U.S. Cl.
  CPC ............ *G06T 7/593* (2017.01); *G06T 7/536* (2017.01); *G06T 2207/10028* (2013.01); *G06T 2207/30261* (2013.01)

(58) Field of Classification Search
  CPC ............ G06T 7/593; G06T 7/536; G06T 2207/10028; G06T 2207/30261
  See application file for complete search history.

(56) References Cited

U.S. PATENT DOCUMENTS

| | | | | |
|---|---|---|---|---|
| 6,678,632 B1 * | 1/2004 | Iannarilli, Jr. | ......... | G01N 21/21 702/153 |
| 8,305,578 B1 * | 11/2012 | Mudge | ...................... | G01J 4/04 356/367 |
| 9,372,119 B2 * | 6/2016 | Silny | .......................... | G01J 4/00 |
| 10,659,751 B1 * | 5/2020 | Briggs | .................. | G06V 30/194 |
| 10,794,767 B1 * | 10/2020 | Acker | ..................... | G01N 21/21 |
| 11,187,523 B1 * | 11/2021 | DeWeert | ................ | G01B 11/24 |
| 2009/0135183 A1 * | 5/2009 | Sato | ........................... | G06T 7/70 345/426 |
| 2014/0043481 A1 * | 2/2014 | Tillotson | ................... | G06T 7/20 348/E7.085 |

(Continued)

FOREIGN PATENT DOCUMENTS

WO   WO-2014018213 A1 *   1/2014   ................ G01J 4/04
WO   WO-2018165027 A1 *   9/2018   ........... G06K 9/0063

OTHER PUBLICATIONS

Polarization-based vision through haze, Yoav Y. Schechner et al., Applied optics, Jan. 20, 2003, pp. 511-525 (Year: 2003).*

(Continued)

*Primary Examiner* — Jayesh A Patel

(57) ABSTRACT

Methods, systems, and devices for object detection are described. An example method for object detection is provided which may include capturing at least three polarization angles of a scene. The method may include translating polarization parameters associated with the at least three polarization angles to a reference angle to create a vector map and resolving the vector map into parallel components and perpendicular components, wherein the parallel components are parallel to a plane of incidence of light in the scene and the perpendicular components are perpendicular. The method may further include determining a range map based at least in part on the parallel and perpendicular components, detecting an object present in the scene using the range map and an airlight scattering polarization component, and outputting an indication of the object.

44 Claims, 8 Drawing Sheets

(56) References Cited

U.S. PATENT DOCUMENTS

2017/0178399 A1* 6/2017 Fest .................... G06T 17/00
2019/0369006 A1* 12/2019 Jiang ................... G02B 5/3083
2021/0150744 A1* 5/2021 Sambongi ........... H04N 13/254
2021/0312639 A1* 10/2021 Choiniere ............ G06T 7/207

OTHER PUBLICATIONS

Single Image Defogging by Multiscale Depth Fusion, Yuan-Kai wang et al., IEEE, Nov. 2014, pp. 4826-4837 (Year: 2014).*
Inversion by P4: polarization-picture post-processing, Yoav Y Schechner, 2011, pp. 638-648 (Year: 2011).*
Instant Dehazing of Images Using Polarization, Yoav Y Schechner et al, IEEE, 2001, pp. I-325-I-332 (Year: 2001).*
Image dehazing using polarization effects of objects and airlight, Shuai Fang et al., Aug. 2014, pp. 1-15 (Year: 2014).*
Haze removal for UAV reconnaissance images using layered scattering model, Huang Yuqing et al, CSAA, Feb. 23, 2016, pp. 502-511 (Year: 2016).*
Schechner, et al., Polarization-based vision through haze, Applied Optics, Jan. 20, 2003, vol. 42, No. 3, Optical Society of America.

* cited by examiner

SEE-AND-AVOID SENSOR

FIELD OF TECHNOLOGY

The following relates to object detection, including object detection against background clutter of a horizon.

SUMMARY

The described techniques relate to improved methods, systems, devices, and apparatuses that support object detection against background clutter of a horizon. Generally, the described techniques provide for automatic in-flight detection of far objects on a horizon. A camera onboard an aircraft may take images of the horizon at different polarization angles. The images may each have a set of polarization parameters that can be used to determine a vector map, which can be resolved into parallel and perpendicular components. A range map can be determined from the vector map based on the parallel and perpendicular components. From the range map and an airlight scattering polarization component, an object that is otherwise unable to be seen by the unaided human eye may be detected. Furthermore, the object may be detected quickly, which may enable avoidance of objects for high-speed aircraft.

A method of object detection is described. The method may include capturing an image of a scene, the image containing at least three polarization angles, where each of the at least three polarization angles is associated with a different polarization angle, translating polarization parameters associated with the at least three polarization angles to a reference angle to create a vector map, resolving the vector map into parallel components and perpendicular components, where the parallel components are parallel to a plane of incidence of light in the scene and the perpendicular components are perpendicular to the plane of incidence, determining a range map based on the parallel components and the perpendicular components, detecting an object present in the scene based on the range map and an airlight scattering polarization component, and outputting an indication of the object based on the detection of the object.

An apparatus for object detection is described. The apparatus may include a processor, memory coupled with the processor, and instructions stored in the memory. The instructions may be executable by the processor to cause the apparatus to capture an image of a scene, the image containing at least three polarization angles, where each of the at least three polarization angles is associated with a different polarization angle, translate polarization parameters associated with the at least three polarization angles to a reference angle to create a vector map, resolve the vector map into parallel components and perpendicular components, where the parallel components are parallel to a plane of incidence of light in the scene and the perpendicular components are perpendicular to the plane of incidence, determine a range map based on the parallel components and the perpendicular components, detect an object present in the scene based on the range map and an airlight scattering polarization component, and output an indication of the object based on the detection of the object.

Another apparatus for object detection is described. The apparatus may include means for capturing an image of a scene, the image containing at least three polarization angles, where each of the at least three polarization angles is associated with a different polarization angle, translating polarization parameters associated with the at least three polarization angles to a reference angle to create a vector map, resolving the vector map into parallel components and perpendicular components, where the parallel components are parallel to a plane of incidence of light in the scene and the perpendicular components are perpendicular to the plane of incidence, determining a range map based on the parallel components and the perpendicular components, detecting an object present in the scene based on the range map and an airlight scattering polarization component, and outputting an indication of the object based on the detection of the object.

A non-transitory computer-readable medium storing code for object detection is described. The code may include instructions executable by a processor to capture an image of a scene, the image containing at least three polarization angles, where each of the at least three polarization angles is associated with a different polarization angle, translate polarization parameters associated with the at least three polarization angles to a reference angle to create a vector map, resolve the vector map into parallel components and perpendicular components, where the parallel components are parallel to a plane of incidence of light in the scene and the perpendicular components are perpendicular to the plane of incidence, determine a range map based on the parallel components and the perpendicular components, detect an object present in the scene based on the range map and an airlight scattering polarization component, and output an indication of the object based on the detection of the object.

In some examples of the method, apparatuses, and non-transitory computer-readable medium described herein, translating the polarization parameters associated with the at least three polarization angles further may include operations, features, means, or instructions for creating a composite image of the at least three polarization angles, where each pixel of the composite image contains polarization parameters for the pixel.

Some examples of the method, apparatuses, and non-transitory computer-readable medium described herein may further include operations, features, means, or instructions for calculating the polarization parameters for each polarization subregion of each pixel of the image.

In some examples of the method, apparatuses, and non-transitory computer-readable medium described herein, translating polarization parameters associated with the at least three polarization angles to the reference angle to create the vector map further may include operations, features, means, or instructions for calculating the polarization parameters from polarization data associated with the at least three polarization angles, where the polarization parameters include an angle-of-polarization and a degree-of-linear-polarization, and performing a vector dot product on the polarization parameters and the reference angle for every pixel of the at least three polarization angles.

In some examples of the method, apparatuses, and non-transitory computer-readable medium described herein, determining the range map further may include operations, features, means, or instructions for bounding the range values to a predetermined upper value and a predetermined lower value.

In some examples of the method, apparatuses, and non-transitory computer-readable medium described herein, the airlight scattering polarization component includes a strongest airlight scattering polarization component at a selected portion of the scene.

In some examples of the method, apparatuses, and non-transitory computer-readable medium described herein, determining the range map further may include operations, features, means, or instructions for dividing the airlight scattering polarization component by a vector component of polarization having a least transmission value to generate a polarization vector component magnitude to airlight ratio, and modifying the range map with the polarization vector component magnitude to airlight ratio.

In some examples of the method, apparatuses, and non-transitory computer-readable medium described herein, the polarization parameters for the pixel further may include operations, features, means, or instructions for at least three linear polarization parameters for the pixel.

In some examples of the method, apparatuses, and non-transitory computer-readable medium described herein, the indication of the object includes location information related to the object.

In some examples of the method, apparatuses, and non-transitory computer-readable medium described herein, the image may be taken at a first time.

Some examples of the method, apparatuses, and non-transitory computer-readable medium described herein may further include operations, features, means, or instructions for capturing a second image of the scene, the second image containing at least three second polarization angles, where each of the at least three second polarization angles may be associated with the different polarization angles, and where the second image may be taken at a second time, determining a second range map based on the at least three second polarization angles of the second image of the scene, detecting the object in the second range map, comparing the second range map to the first range map, and determining whether a bearing of the object may have changed between the first time and the second time, where the indication further includes an intercept course warning.

DETAILED DESCRIPTION

Aircraft flying at high speeds may only have moments to detect and avoid an oncoming aircraft or other object in the flight space. However, the visual field may be hard to see due to atmospheric conditions. An oncoming aircraft close on the horizon may be obscured by haze, for example. Techniques described herein provide fast, automated detection and alert systems that detect such objects in poor visual conditions. For example, the techniques provide a see-and-avoid system for detection of objects against background clutter of the horizon, at far ranges (e.g., miles), which normally appear as unresolvable specks. The techniques may also detect objects that are uncooperative targets (e.g., the techniques do not require specialized electronics or signaling from the object being detected).

Aspects of the disclosure are initially described in the context of a see-and-avoid system. Aspects of the disclosure are further described by a block diagram, a flow diagram, example image processing, a graph, and resultant images. Aspects of the disclosure are further illustrated by and described with reference to flowcharts that relate to object detection in a visual field.

Figure 1:
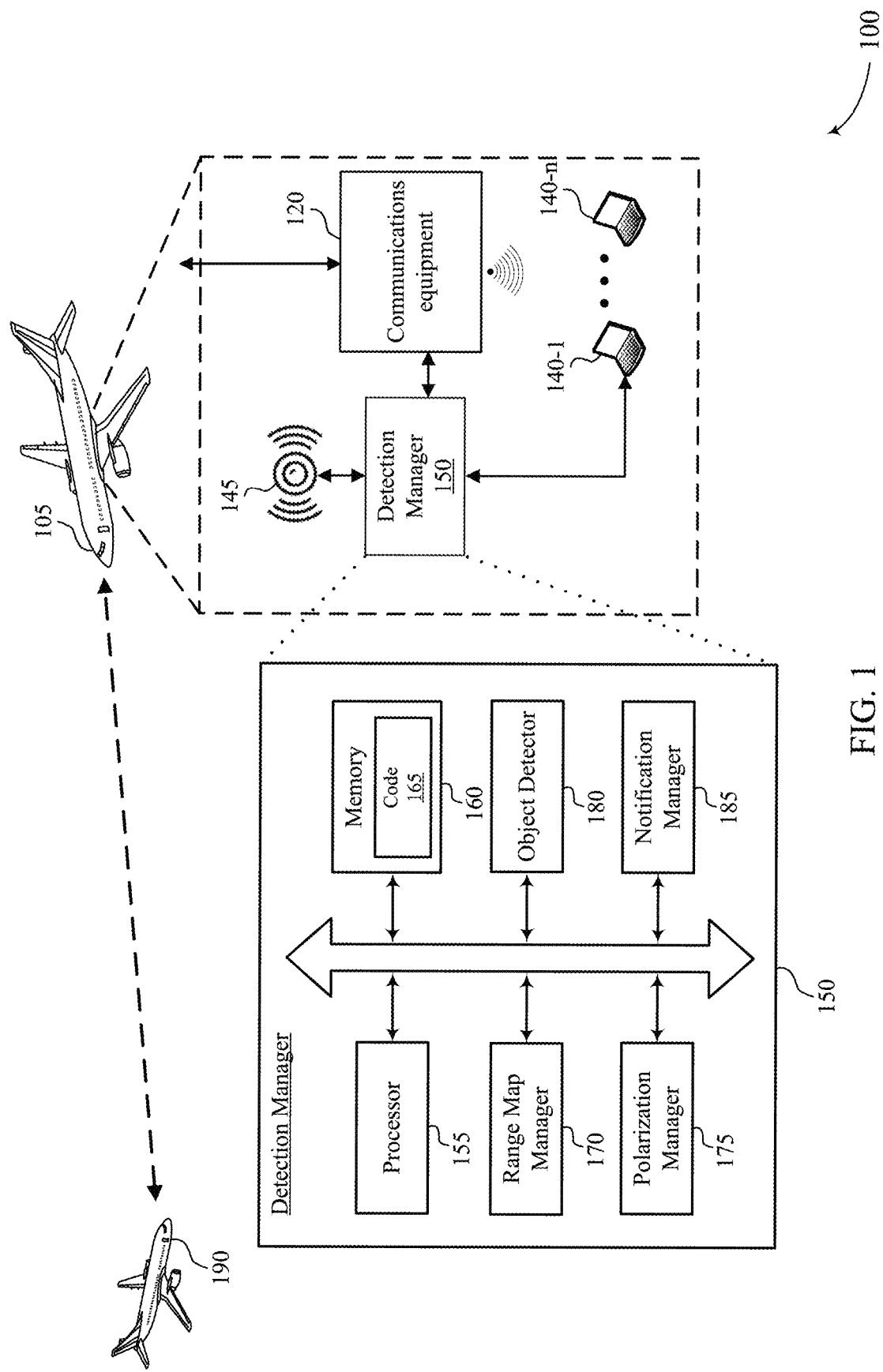
FIG. 1 illustrates an example of a see-and-avoid system that supports object detection in a visual field in accordance with aspects of the present disclosure.

FIG. 1 illustrates an example of a see-and-avoid system 100 that supports object detection in a visual field in accordance with aspects of the present disclosure. The see-and-avoid system 100 includes a sensor 145, a detection manager 150, and a communication environment which may include a communications system 120, and one or more devices 140-1 to 140-n (referred to collectively as one or more devices 140), onboard a mobile platform 105. The sensor 145 and detection manager 150 may provide techniques for detecting objects in a visual field.

The mobile platform 105 may be any device, apparatus, or object capable of supporting object detection and of changing location. For example, the mobile platform may be a mobile transport carrier such as an aircraft, a space shuttle, a ship, a vehicle, or the like.

Located onboard mobile platform 105 is a detection manager 150 that provides visual object detection. The see-and-avoid system 100 may be connectable to at least one device 160 and to one or more networks directly, or wirelessly via the communications system 120. The detection manager 150 may perform image processing from images captured at the sensor 145 in order to detect objects that may be in the proximity of the mobile platform 105.

Figure 2:
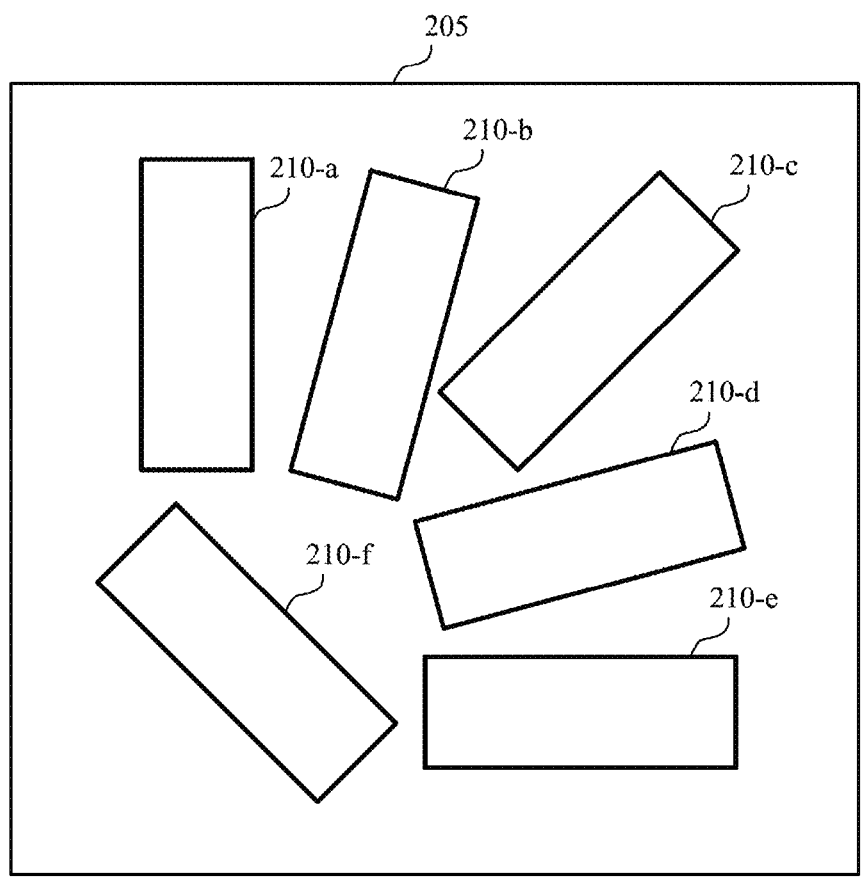
FIG. 2 illustrates an example of a sensor with different polarization detection angles that supports object detection in a visual field in accordance with aspects of the present disclosure.

The sensor 145 may be a camera with one or more polarization sensors that can capture an image of a scene with the image containing multiple polarization angles. For example, the polarization sensors may capture multiple polarization angles or multiple views of the same scene with different polarization angles. FIG. 2 illustrates an example 200 of the sensor 205 with different polarization detection angles that supports object detection in a visual field. In some examples, the sensor 205 may implement aspects of the sensor 145 of FIG. 1. The sensor 205 may capture an image of a scene, the image containing at least three polarization angles, wherein each of the at least three polarization angles is associated with a different polarization angle. In some examples, the image containing at least three polarization angles is taken at a first time.

The detection manager 150 may include a processor 155, a memory 160, a range map manager 170, an object detector, a polarization manager 175, and a notification manager 185. The detection manager 150 may manage detection of potential objects in a visual field through processing images from the sensor 145. The processor 155 may execute instructions stored on memory 160 to perform the functions of detection manager 150.

The processor 155 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some cases, the processor 155 may be configured to operate a memory array using a memory controller. In other cases, a memory controller may be integrated into the processor 155. The processor 155 may be configured to execute computer-readable instructions stored in a memory (e.g., the memory 160) to cause the detection manager 150 to perform various functions (e.g., functions or tasks supporting object detection in a visual field).

Memory 160 may store the instructions for the operation of detection manager 150, for example in code 165. The memory 160 may include RAM and ROM. The memory 150 may store computer-readable, computer-executable code 165 including instructions that, when executed, cause the processor to perform various functions described herein. In some cases, the memory 160 may contain, among other things, a BIOS which may control basic hardware or software operation such as the interaction with peripheral components or devices.

The detection manager 150, or its sub-components, may be implemented in hardware, code (e.g., software or firmware) executed by a processor, or any combination thereof. If implemented in code executed by a processor, the functions of the detection manager 150, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The polarization manager 175 may translate polarization parameters associated with the at least three polarization angles from the sensor 145 to a reference angle to create a vector map. Translating the polarization parameters associated with the at least three polarization angles may further include creating a composite image of the at least three polarization angles, wherein each pixel of the composite image contains polarization parameters for the pixel. The composite image may be a composite greyscale image. The polarization manager 175 may also calculate the polarization parameters for each pixel of the image.

In some examples, translating polarization parameters associated with the at least three polarization angles to the reference angle to create the vector map further include calculating the polarization parameters from polarization data associated with the at least three polarization angles, wherein the polarization parameters include an angle-of-polarization and a degree-of-linear-polarization, and performing a vector dot product on the polarization parameters and the reference angle for every pixel of the image. In some examples, the polarization parameters for the pixel further includes at least three linear polarization parameters for the pixel.

The range map manager 170 may resolve the vector map into parallel components and perpendicular components, wherein the parallel components are parallel to a plane of incidence of light in the scene and the perpendicular components are perpendicular to the plane of incidence. The range map manager 170 may determine a range map based at least in part on the parallel components and the perpendicular components. In some examples, determining the range map further includes bounding the range values to a predetermined upper value and a predetermined lower value.

The range map manager 170 may determine the range map by dividing the airlight scattering polarization component by a vector component of polarization having a least transmission value to generate a polarization vector component magnitude to airlight ratio and modifying the range map with the polarization vector component magnitude to airlight ratio.

The object detector 180 may detect an object present in the scene based at least in part on the range map and an airlight scattering polarization component. In some examples, the airlight scattering polarization component includes a strongest airlight scattering polarization component at a selected portion of the scene.

The notification manager 185 may output an indication of the object based at least in part on the detection of the object. The indication may be a visual warning, auditory warning, tactile warning, or any combination. In some examples, the indication of the object comprises location information related to the object or identifying information of the object (e.g., a type of the object, a communications ID of the object, etc.).

In some examples, the range map is a first range map, and the sensor 145 may further capture a second image of the scene, the second image containing at least three second polarization angles, wherein each of the at least three second polarization angles is associated with the different polarization angles, and wherein the second image is taken at a second time. The range map manager 170 may determine a second range map based at least in part on the at least three second polarization angles of the second image of the scene. The object detector 180 may detect the object in the second range map. The range map manager 170 may further compare the second range map to the first range map and determine whether a bearing of the object has changed between the first time and the second time. The notification manager may further provide an indication that includes an intercept course warning.

The communications equipment 120 may include one or more transceivers or a satellite terminal that may be multi-user access terminals providing communications such as network access connectivity to the devices 140 on the mobile platform 105. The communications equipment 120 may include a satellite terminal communications antenna configured for receiving and transmitting signals from one or more communications satellites. The communications system 120 may be configured for uni-directional or bi-directional communications with one or more communications satellites, radios, or other communication systems. The communication equipment 120 may include a network access unit, a wireless access point, one or more mobile terminal antennas, one or more transceivers, and one or more modems. All or some of the communication equipment 120 may be located in an interior of the mobile platform 105.

The communications equipment 120 may include an input/output (I/O) controller that may manage input and output signals for the detection manager 150 and devices 140. The I/O controller may also manage peripherals not integrated into the detection manager 150 and devices 140. In some cases, the I/O controller may represent a physical connection or port to an external peripheral. In some cases, the I/O controller may utilize an operating system such as iOS®, ANDROID®, MS-DOS®, MS-WINDOWS®, OS/2®, UNIX®, LINUX®, or another known operating system. In other cases, the I/O controller may represent or interact with a modem, a keyboard, a mouse, a touchscreen, or a similar device. In some cases, the I/O controller may be implemented as part of a processor. In some cases, a user may interact with the detection manager 150 and devices 140 via the I/O controller or via hardware components controlled by the I/O controller.

In the example of FIG. 1, two devices 140-1 and 140-n are shown, which may be wireless user devices or fixed devices. The devices 140 may be part of a navigation system or flight system of the mobile platform 105. One or more of the devices 140 may provide a notification of an object, such as aircraft 190, detected by the detection manager. The notification may indicate a collision course or otherwise indicate detection of an object near the travel path of the mobile platform 105. Devices device 140-1 or 140-n may also wireless devices, personal electronic devices, mobile phones, personal digital assistants (PDAs), tablet computers, laptop computers, personal computers, other handheld devices, netbooks, notebook computers, display devices (e.g., TVs, computer monitors, etc.), printers, and the like. Devices 140-1 and 140-n may be devices installed within mobile platform 105, such as a display screen or monitor on the back of a seat. In other examples, other numbers of devices 140 may be included.

The see-and-avoid system 100 may use techniques described herein to detect objects, such as aircraft 190, despite difficult visual conditions such as haze, from onboard the mobile platform 105. These techniques may improve navigation, reduce the probability of a collision, provide additional time for navigation away from the detected object due to faster detection of the object, provide automatic instead of manual detection, process polarization data for many different angles, and provide better visual information of the area around the mobile platform 105.

FIG. 2 illustrates an example 200 of a sensor 205 with different polarization detection angles that supports object detection in a visual field in accordance with aspects of the present disclosure. In some examples, the sensor 205 may implement aspects of the sensor 145 of FIG. 1. The example 200 is intended to illustrate the different polarization angles of images possible at the sensor 205.

The sensor 205 may include polarization elements 210-a through 210-f (referred to herein as polarization elements 210). The polarization elements 210 are all arranged at different angles. The polarization elements 210 may capture linear polarization. In some examples, the polarization elements 210 may detect circular polarization. In some examples, the sensor 205 may be a camera that is a FLIR thermal camera.

The sensor 205 may include on-chip polarization sensor technology that enables smaller size/weight/power package and may be resistant to detrimental motion effects (e.g. maneuvering of the mobile platform 105, vibration effects on the sensor 205, etc.).

The sensor 205 may measure all angles of linear polarization in the image, which may allow calculation of all polarization parameters that enables the automation of object detection for a wider range of sun angles, and makes it resistant to the tilt angle of the sensor 205 itself (e.g. if the mobile platform 105 is not level).

The sensor 205 may measure all of the polarization angles at approximately the same time (all as part of the same image) so there are no irregularities due to objects moving within the scene (other than typical shutter speed blurring). For conventional systems, one image may be taken at a certain polarization (determined by hand) and another image may be taken with the polarization filter perpendicular to the first (e.g., close to the same time but may not be exactly concurrently), and these images are then assembled together to get polarization data. When hosted onboard a fast moving aircraft with maneuvering and engine vibrations, it would be very difficult to re-orient these two images together (e.g., image warping corrections to remove relative motion between frames), because the images would need to be co-registered together with each-other to extract useful polarization data from them. The danger in all of this is that polarization data is extracted based on comparisons of image intensity in the set of images, and relative intensity differences due to image mis-alignment would appear as-if that region of the image had a polarization component when it really did not. Techniques described herein eliminate these problems.

Having three or more angles of polarization captured together provides additional information that can make the object detection process more accurate. For example, a full set of Stokes parameters can be formed from only three angles of polarization (horizontal, vertical, and 45-degrees in-between) but having four or more angles of polarization potentially allows better quality polarization data (e.g., an extra measurement for cross-checking the full set polarization data).

Figure 3:
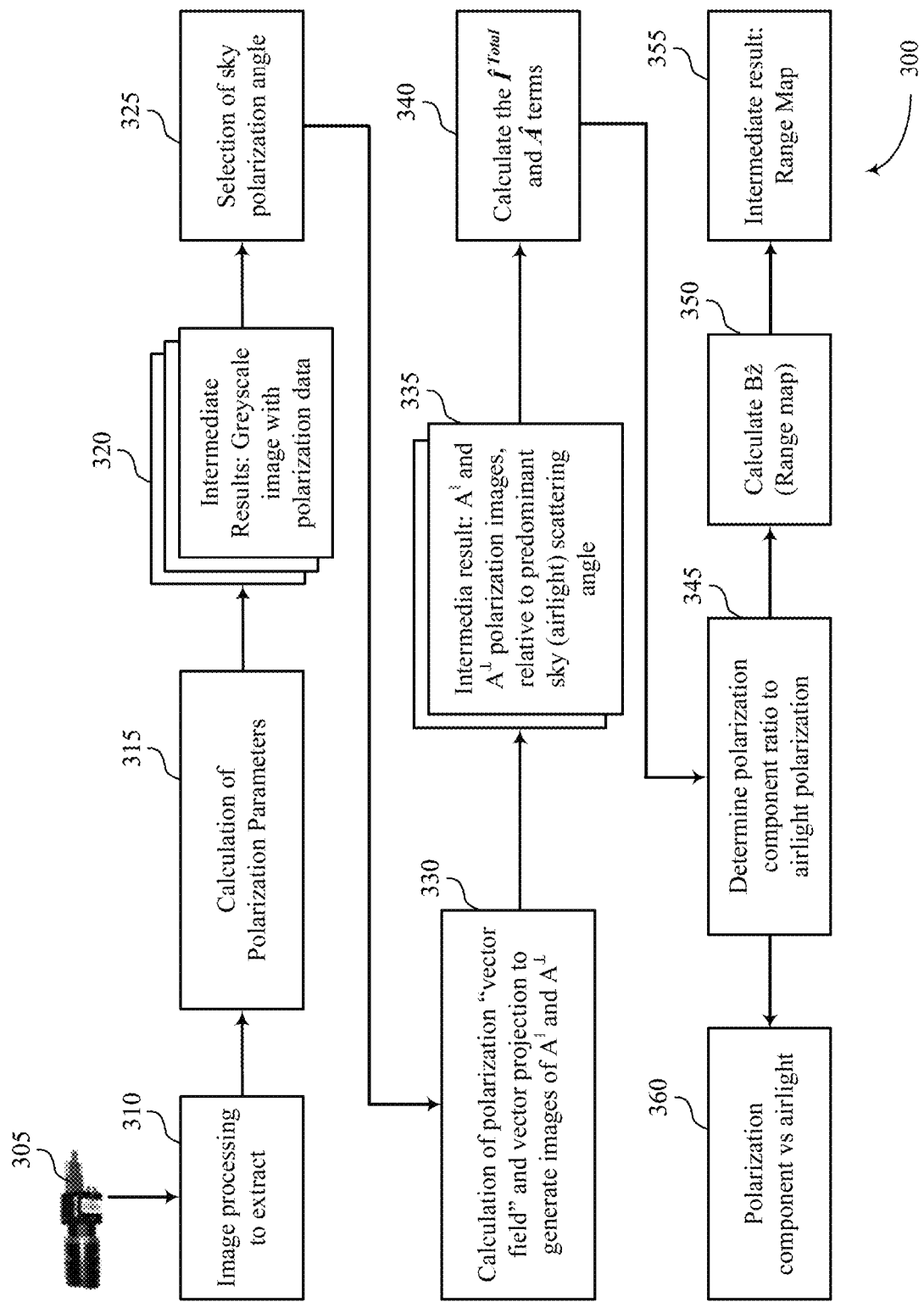
FIG. 3 illustrates an example flow diagram of a see-and-avoid system that supports object detection in a visual field in accordance with aspects of the present disclosure.

FIG. 3 illustrates an example flow diagram of a see-and-avoid system that supports object detection in a visual field in accordance with aspects of the present disclosure. The features of FIG. 3 may be performed by a sensor, such as sensors 145 or 205 of FIGS. 1 and 2, and a detection manager, such as detection manager 150 of FIG. 1. FIG. 3 will be described with reference to FIGS. 4-6.

Figure 6:
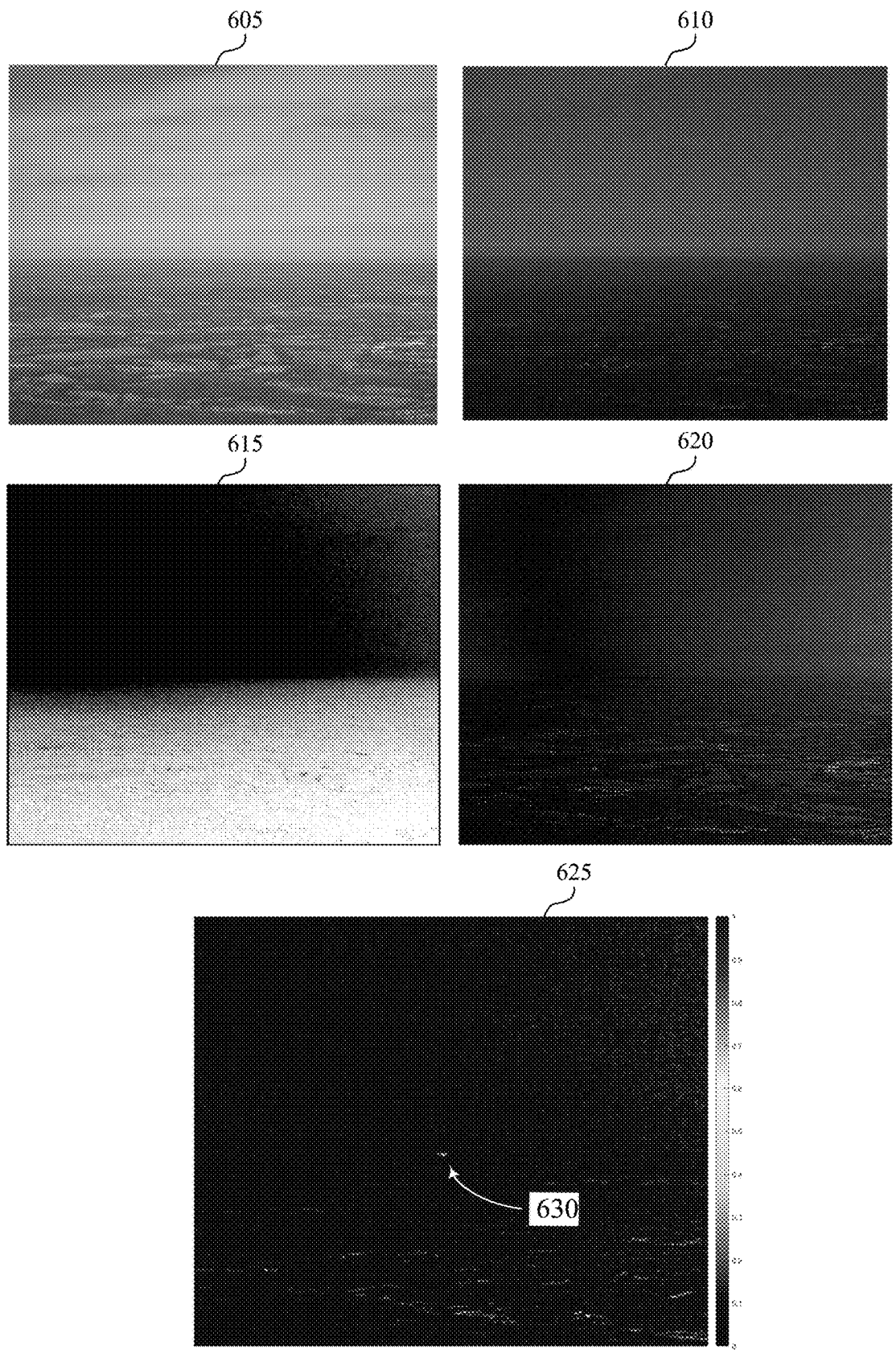
FIG. 6 shows example images related to object detection in a visual field in accordance with aspects of the present disclosure.

At 305, a sensor may capture at least one image of a scene, such as the area in front of an aircraft. At 310, the sensor may provide the images for processing to the detection manager. At 315, the detection manager may calculate polarization parameters, such as Stokes, angle of polarization, degree of linear polarization, and the like. The images may be processed to extract a composite image and polarization results. Referring to FIG. 6, which shows example images related to object detection in a visual field in accordance with aspects of the present disclosure, these images may be similar to images 605 and 610. Image 605 may show the average intensities of the visual image. Image 610 may show a hue, saturation, and value (HSV) visualization of the polarization.

Returning to FIG. 3, at 320, the detection manager may obtain intermediate results for the image processing. The intermediate results may be composite images with polarization data for every pixel in the image. At 325, the detection manager may select a sky polarization angle (e.g., estimating $A_\infty$ and p). $A_\infty$ may be an airlight radiance corresponding to an object at an infinite distance, e.g., the horizon. Airtight may be the part of the illumination scattered towards the sensor by aerosols in the optical medium (e.g., atmosphere). The term p may refer to the airlight degree of polarization. The airlight parallel and perpendicular to a place of incidence may be referred to as $A^\parallel$ and $A^\perp$, respectively.

At 330, the detection manager may calculate the polarization vector field and vector projection to generate images of $A^\parallel$ and $A^\perp$. In some examples, the raw polarization data from the sensor may have been collected at various angles, such as 0, 45, 180, and 135 (or −45 degrees from the frame of reference of the sensor). The polarization data from sensor may be translated into polarization data that matches $A^\parallel$ and $A^\perp$. This requires converting the polarization data (e.g., originally taken at the sensors multiple angles in the detector) to another polarization angle $\Theta$ (e.g. as if the image were taken with a polarizer at that angle $\Theta$).

Figure 4:
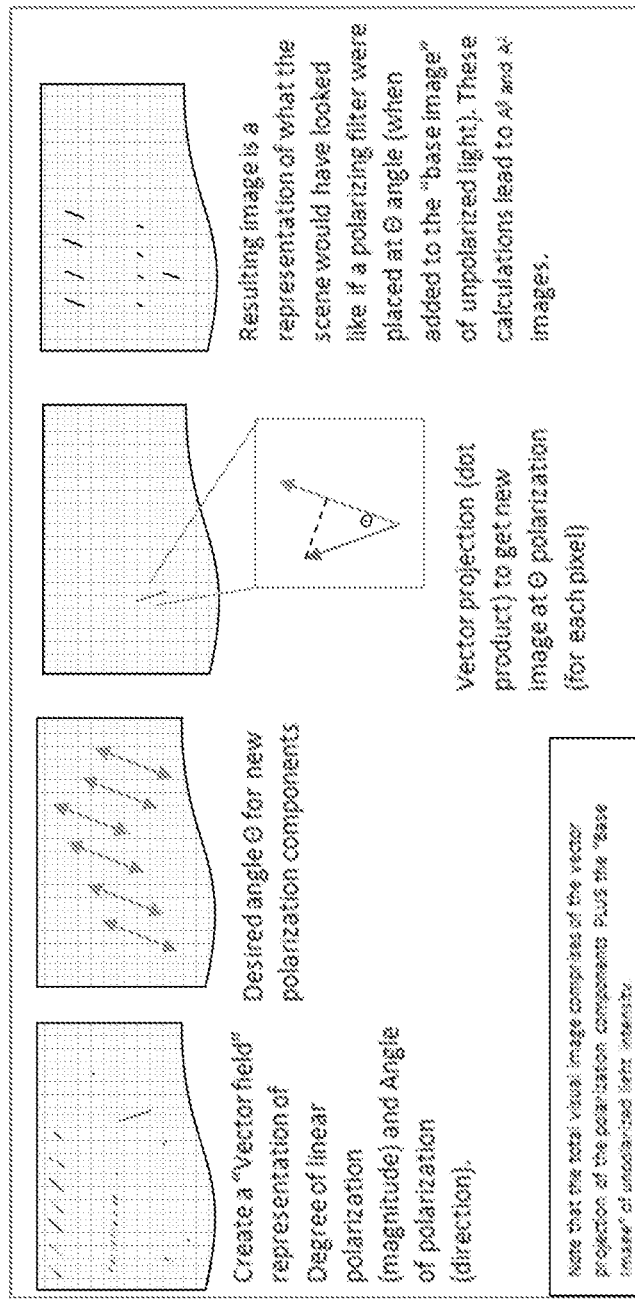
FIG. 4 shows an example vector field, intermediate processing, and a resultant image that supports object detection in a visual field in accordance with aspects of the present disclosure.

The detection manager may use Angle-of-Polarization and Degree-of-Linear-Polarization as vector products, then perform a vector "dot product" (e.g., projection) of the measured polarization projected onto the desired angle of polarization. This may be performed for every pixel across the image. One set of angle projections gives an A-Max image while another set of vector projections (e.g., 90-deg perpendicular) gives the A-Min image. FIG. 4 shows an example 400 of a vector field, intermediate processing, and a resultant image that supports object detection in a visual field in accordance with aspects of the present disclosure. This technique may lend itself to acceleration via processing hardware that may be developed for linear-algebra tasks.

Figure 5:
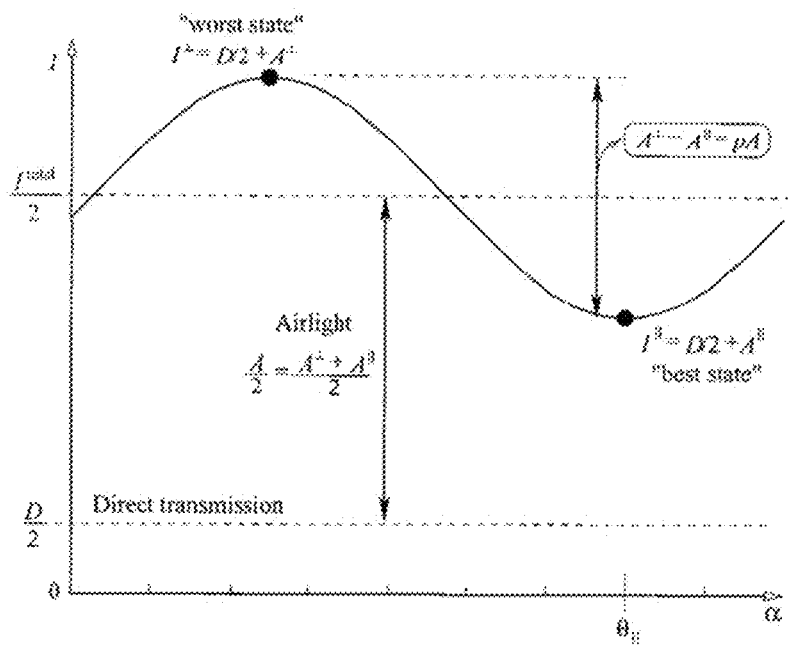
FIG. 5 shows an example diagram of image irradiance as a function of polarization orientation angle that supports object detection in a visual field in accordance with aspects of the present disclosure.

Returning to FIG. 3 at 335, an intermediate result is provided of $A^{\parallel}$ and $A^{\perp}$ polarization images, relative to the predominant sky (airlight) scattering angle. The results may represent "best state" and "worst state" images. FIG. 5 shows an example diagram 500 of image irradiance as a function of polarization orientation angle that supports object detection in a visual field in accordance with aspects of the present disclosure.

Returning to FIG. 3 at 340, the detection manager may calculate $\hat{I}^{Total}$ and $\hat{A}$ terms. $\hat{A}$ may be calculated according to Equation (1), and $\hat{I}^{Total}$ may be calculated according to Equation (2). At 345, the detection manager may determine polarization component ratio to airlight polarization. At 350, the detection manager may determine the range map $\widehat{\beta z}$, according to Equation (3). At 355, the intermediate range map results may be obtained. Image 615 (see FIG. 6) illustrates an example range map, which has been contrast-corrected for better visibility.

$$\hat{A} = \frac{(\hat{I}^{\parallel} - \hat{I}^{\perp})}{p} \quad (1)$$

$$\hat{I}^{total} = \hat{I}^{\parallel} + \hat{I}^{\perp} \quad (2)$$

$$\widehat{\beta z} = -\ln\left[1 - \frac{\hat{A}(x, y)}{A_{\infty}}\right] \quad (3)$$

The intermediate term $$\frac{\hat{A}(x, y)}{A_{\infty}}$$

may be clamped so that it sits within the range [1.0-0.1]. This may prevent out of range values from creating complex numbers in the result. The techniques described herein provide for automated detection.

Additional calculations may be performed based on the polarization vector field from 330. At 360, the vector component of polarization may be selected at the distant sky near the horizon, which may represent the strongest airlight scattering polarization component. This can be referred to as the "airlight reference magnitude" ("AirRefMag"). This is based on the magnitude sum of all possible polarization angles captured by the sensor, and not just the two angles $A^{\parallel}$ and $A^{\perp}$. The detection manager may take the vector component of polarization "best state" (e.g., least transmission, using just the polarization component, not the entire intensity $I^{\parallel}$). This may be referred to as the "Polarization Component Minimum" ("PolCompMin"). The "PolCompMin" may only incorporates the polarization component terms, and not the 'I' intensity terms or 'D' direct transmission.

The detection manager may divide AirRefMag by PolCompMin in a per-element division (not matrix division). This may yield a "polarization vector component magnitude Ratio to airlight" which does not incorporate the base (unpolarized) image intensity but is mainly a factor of the received polarization vector field. The images 620 and 625 shown in FIG. 6 may be final images generated by the detection manager. Image 625 includes object 630, which is not easily visible in image 620 but is clearly visible in image 625. The image 620 may correspond to the airlight and the image 625 may correspond to the polarization component. The notification manager may output a notification or other indication of the detection of the object 630.

The techniques described herein may provide improved object detection because the distant horizon may be attenuated (dark) and any intermediate object (an object closer than the vanishing horizon) appears as a bright spot, as shown in image 625.

Some examples of the techniques do not incorporate the base (unpolarized) component of light intensity, because it may taint the measurements by the bright or dark appearance of the object (e.g., the target aircraft). Based on the target aircraft's coloring, background, and the angle of the sun between the observer and the target, the other aircraft may appear to be brighter or darker as compared to the background intensity. These techniques remove bias of the base illumination (light or dark) of the target aircraft and focuses on detecting any polarization component that is different than the prevailing airlight (distant horizon).

The techniques may further include image processing techniques such as region selection, thresholding, or local maximum selection to pick-out the bright spot representing the other aircraft, locate it in the image and create an automated alert. Knowing the location of the object in the image coordinates (along with the pointing direction of the sensor from the host aircraft's navigational system) enables calculation of the bearing (azimuth) and relative elevation angle of the detected object relative to the host aircraft, so that an automated alert could also incorporate the direction (compass bearing) of the detection.

FIG. 3 has been described in terms of single images for illustrative purposes. However, observing successive images over time (in a video sequence) may allow the automated detection to provide more information. For example, tracking the detection over multiple frames (over a span of time) and may help determine if the object exhibits any relative motion in bearing angle. If the relative bearing to the object does not change over time, then the aircraft could be on an intercept course. If the bearing to the object does change over time, then the object will either pass ahead or behind the host aircraft. Techniques described herein may provide this information to a pilot or other user.

Figure 7:
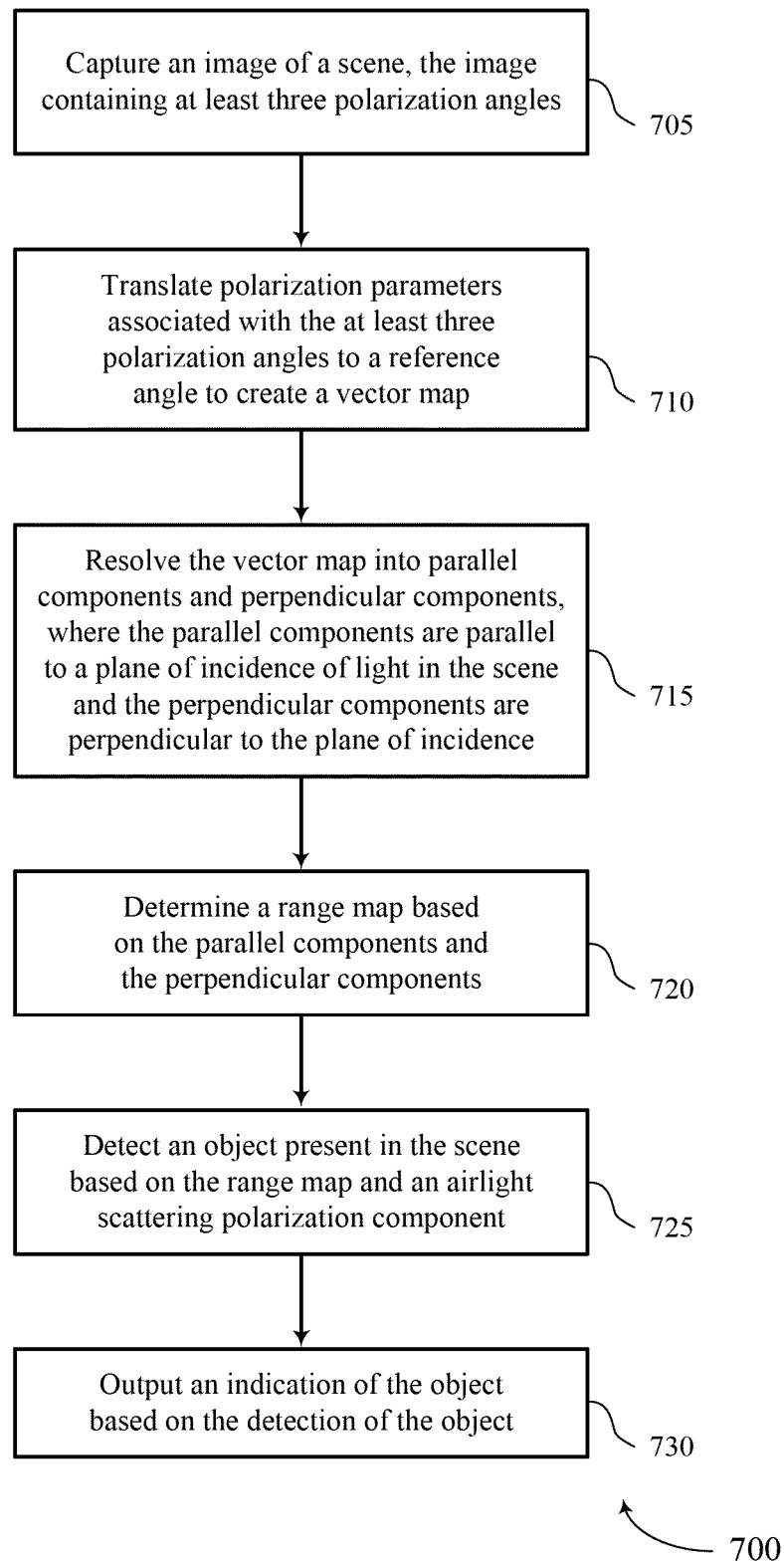
FIGS. 7 and 8 show flowcharts illustrating methods that support object detection in a visual field in accordance with aspects of the present disclosure.

FIG. 7 shows a flowchart illustrating a method 700 that supports object detection in a visual field in accordance with aspects of the present disclosure. The operations of method 700 may be implemented by a device or its components as described herein. For example, the operations of method 700 may be performed by a detection manager and sensor described with reference to FIGS. 1 through 6. In some examples, a processor may execute a set of instructions to control the functional elements of the detection manager to perform the functions described below. Additionally or alternatively, the detection manager may perform aspects of the functions described below using special-purpose hardware.

At 705, the device may capture at least three polarization angles of a scene. The operations of 705 may be performed according to the methods described herein. In some examples, aspects of the operations of 705 may be performed by a sensor as described with reference to FIGS. 1 through 6.

At 710, the device may translate polarization parameters associated with the at least three polarization angles to a reference angle to create a vector map. The operations of 710 may be performed according to the methods described herein. In some examples, aspects of the operations of 710 may be performed by a detection manager as described with reference to FIGS. 1 through 6.

At 715, the device may resolve the vector map into parallel components and perpendicular components, where the parallel components are parallel to a plane of incidence of light in the scene and the perpendicular components are perpendicular to the plane of incidence. The operations of 715 may be performed according to the methods described herein. In some examples, aspects of the operations of 715 may be performed by a detection manager as described with reference to FIGS. 1 through 6.

At 720, the device may determine a range map based on the parallel components and the perpendicular components. The operations of 720 may be performed according to the methods described herein. In some examples, aspects of the operations of 720 may be performed by a detection manager as described with reference to FIGS. 1 through 6.

At 725, the device may detect an object present in the scene based on the range map and an airlight scattering polarization component. The operations of 725 may be performed according to the methods described herein. In some examples, aspects of the operations of 725 may be performed by a detection manager as described with reference to FIGS. 1 through 6.

At 730, the device may output an indication of the object based on the detection of the object. The operations of 730 may be performed according to the methods described herein. In some examples, aspects of the operations of 730 may be performed by a detection manager as described with reference to FIGS. 1 through 6.

Figure 8:
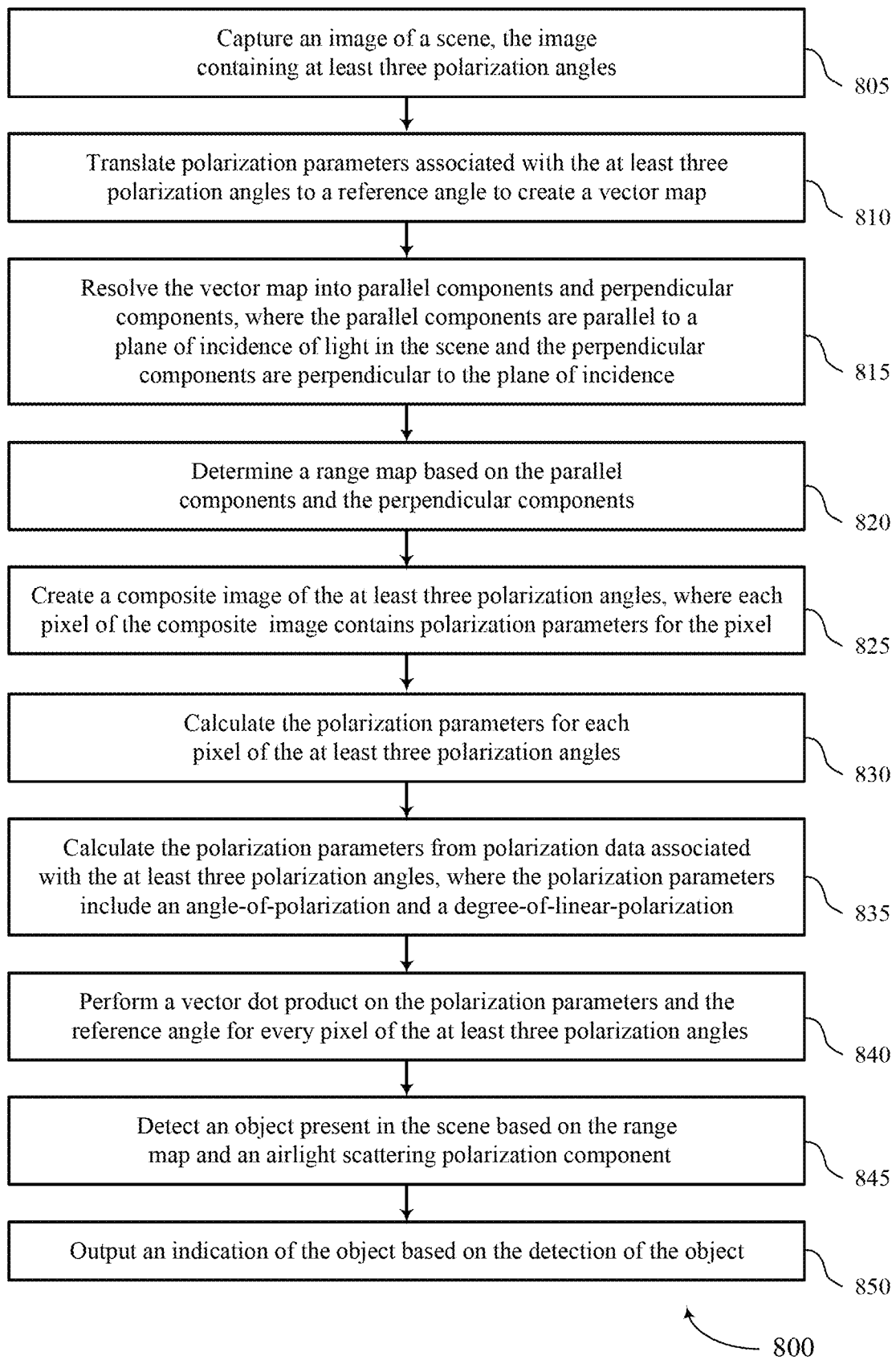

FIG. 8 shows a flowchart illustrating a method 800 that supports object detection in a visual field in accordance with aspects of the present disclosure. The operations of method 800 may be implemented by a device or its components as described herein. For example, the operations of method 800 may be performed by a detection manager and sensor described with reference to FIGS. 1 through 6. In some examples, a processor may execute a set of instructions to control the functional elements of the detection manager to perform the functions described below. Additionally or alternatively, the detection manager may perform aspects of the functions described below using special-purpose hardware.

At 805, the device may capture an image of a scene, the image containing at least three polarization angles. The polarization angles may each be different from one another. The operations of 805 may be performed according to the methods described herein. In some examples, aspects of the operations of 805 may be performed by a sensor as described with reference to FIGS. 1 through 6.

At 810, the device may translate polarization parameters associated with the at least three polarization angles to a reference angle to create a vector map. The operations of 810 may be performed according to the methods described herein. In some examples, aspects of the operations of 810 may be performed by a detection manager as described with reference to FIGS. 1 through 6.

At 815, the device may resolve the vector map into parallel components and perpendicular components, where the parallel components are parallel to a plane of incidence of light in the scene and the perpendicular components are perpendicular to the plane of incidence. The operations of 815 may be performed according to the methods described herein. In some examples, aspects of the operations of 815 may be performed by a detection manager as described with reference to FIGS. 1 through 6.

At 820, the device may determine a range map based on the parallel components and the perpendicular components. The operations of 820 may be performed according to the methods described herein. In some examples, aspects of the operations of 820 may be performed by a detection manager as described with reference to FIGS. 1 through 6.

At 825, the device may create a composite image of the at least three polarization angles, where each pixel of the composite image contains polarization parameters for the pixel. The operations of 825 may be performed according to the methods described herein. In some examples, aspects of the operations of 825 may be performed by a detection manager as described with reference to FIGS. 1 through 6.

At 830, the device may calculate the polarization parameters for each pixel of the at least three polarization angles. The operations of 340 may be performed according to the methods described herein. In some examples, aspects of the operations of 830 may be performed by a detection manager as described with reference to FIGS. 1 through 6.

At 835, the device may calculate the polarization parameters from polarization data associated with the at least three polarization angles, where the polarization parameters include an angle-of-polarization and a degree-of-linear-polarization. The operations of 835 may be performed according to the methods described herein. In some examples, aspects of the operations of 835 may be performed by a detection manager as described with reference to FIGS. 1 through 6.

At 840, the device may perform a vector dot product on the polarization parameters and the reference angle for every pixel of the image. The operations of 840 may be performed according to the methods described herein. In some examples, aspects of the operations of 840 may be performed by a detection manager as described with reference to FIGS. 1 through 6.

At 845, the device may detect an object present in the scene based on the range map and an airlight scattering polarization component. The operations of 845 may be performed according to the methods described herein. In some examples, aspects of the operations of 845 may be performed by a detection manager as described with reference to FIGS. 1 through 6.

At 850, the device may output an indication of the object based on the detection of the object. The operations of 850 may be performed according to the methods described herein. In some examples, aspects of the operations of 850 may be performed by a detection manager as described with reference to FIGS. 1 through 6.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for object detection, comprising:
    capturing an image of a scene, the image containing at least three polarization angles;
    translating polarization parameters associated with the at least three polarization angles to a reference angle for each pixel of the at least three polarization angles to create a vector map;
    resolving the vector map into parallel components and perpendicular components, wherein the parallel components are parallel to a plane of incidence of light in the scene and the perpendicular components are perpendicular to the plane of incidence;
    determining a range map based at least in part on the parallel components and the perpendicular components;
    detecting an object present in the scene based at least in part on the range map and an airlight scattering polarization component; and
    outputting an indication of the object based at least in part on the detection of the object.

2. The method of claim 1, wherein translating the polarization parameters associated with the at least three polarization angles further comprises:
    creating a composite image of the at least three polarization angles, wherein each pixel of the composite image contains polarization parameters.

3. The method of claim 1, further comprising:
calculating the polarization parameters for each polarization angle of each pixel of the image.

4. The method of claim 1, wherein translating polarization parameters associated with the at least three polarization angles to the reference angle further comprises:
calculating the polarization parameters from polarization data associated with the at least three polarization angles, wherein the polarization parameters include an angle-of-polarization and a degree-of-linear-polarization; and
performing a vector dot product on the polarization parameters and the reference angle for every pixel of the at least three polarization angles of the image.

5. The method of claim 4, wherein determining the range map further comprises:
bounding range values to a predetermined upper value and a predetermined lower value.

6. The method of claim 1, wherein the airlight scattering polarization component comprises a strongest airlight scattering polarization component at a selected portion of the scene.

7. The method of claim 6, wherein determining the range map further comprises:
dividing the airlight scattering polarization component by a vector component of polarization having a least transmission value to generate a polarization vector component magnitude to airlight ratio; and
modifying the range map with the polarization vector component magnitude to airlight ratio.

8. The method of claim 1, wherein the polarization parameters for the pixel further comprises at least three linear polarization parameters for the pixel.

9. The method of claim 1, wherein the indication of the object comprises location information related to the object.

10. The method of claim 1, wherein the at least three polarization angles are taken at a first time.

11. The method of claim 10, wherein the range map is a first range map, the method further comprising:
capturing a second image of the scene, the second image containing at least three second polarization angles, wherein the second image is taken at a second time;
determining a second range map based at least in part on the at least three second polarization angles of the second image of the scene;
detecting the object in the second range map;
comparing the second range map to the first range map; and
determining whether a bearing of the object has changed between the first time and the second time, wherein the indication further comprises an intercept course warning.

12. An apparatus for object detection, comprising:
a processor,
memory coupled with the processor; and
instructions stored in the memory and executable by the processor to cause the apparatus to:
capture an image of a scene, the image containing at least three polarization angles;
translate polarization parameters associated with the at least three polarization angles to a reference angle for each pixel of the at least three polarization angles to create a vector map;
resolve the vector map into parallel components and perpendicular components, wherein the parallel components are parallel to a plane of incidence of light in the scene and the perpendicular components are perpendicular to the plane of incidence;
determine a range map based at least in part on the parallel components and the perpendicular components;
detect an object present in the scene based at least in part on the range map and an airlight scattering polarization component; and
output an indication of the object based at least in part on the detection of the object.

13. The apparatus of claim 12, wherein the instructions to translate the polarization parameters associated with the at least three polarization angles further are executable by the processor to cause the apparatus to:
create a composite image of the at least three polarization angles, wherein each pixel of the composite image contains polarization parameters for the pixel.

14. The apparatus of claim 12, wherein the instructions are further executable by the processor to cause the apparatus to:
calculate the polarization parameters for each pixel of the at least three polarization angles.

15. The apparatus of claim 12, wherein the instructions to translate polarization parameters associated with the at least three polarization angles to the reference angle further are executable by the processor to cause the apparatus to:
calculate the polarization parameters from polarization data associated with the at least three polarization angles, wherein the polarization parameters include an angle-of-polarization and a degree-of-linear-polarization; and
perform a vector dot product on the polarization parameters and the reference angle for every pixel of the at least three polarization angles of the image.

16. The apparatus of claim 15, wherein the instructions to determine the range map further are executable by the processor to cause the apparatus to:
bound range values to a predetermined upper value and a predetermined lower value.

17. The apparatus of claim 12, wherein the airlight scattering polarization component comprises a strongest airlight scattering polarization component at a selected portion of the scene.

18. The apparatus of claim 17, wherein the instructions to determine the range map further are executable by the processor to cause the apparatus to:
divide the airlight scattering polarization component by a vector component of polarization having a least transmission value to generate a polarization vector component magnitude to airlight ratio; and
modify the range map with the polarization vector component magnitude to airlight ratio.

19. The apparatus of claim 12, wherein the polarization parameters for the pixel further comprises at least three linear polarization parameters for the pixel.

20. The apparatus of claim 12, wherein the indication of the object comprises location information related to the object.

21. The apparatus of claim 12, wherein the image is taken at a first time.

22. The apparatus of claim 21, wherein the range map is a first range map, and the instructions are further executable by the processor to cause the apparatus to:
capture a second image of the scene, the second image containing at least three second polarization angles, wherein the second image is taken at a second time;

determine a second range map based at least in part on the at least three second polarization angles of the second image of the scene;

detect the object in the second range map;

compare the second range map to the first range map; and determine whether a bearing of the object has changed between the first time and the second time, wherein the indication further comprises an intercept course warning.

23. An apparatus for object detection, comprising:

means for capturing an image of a scene, the image containing at least three polarization angles;

means for translating polarization parameters associated with the at least three polarization angles to a reference angle for each pixel of the at least three polarization angles to create a vector map;

means for resolving the vector map into parallel components and perpendicular components, wherein the parallel components are parallel to a plane of incidence of light in the scene and the perpendicular components are perpendicular to the plane of incidence;

means for determining a range map based at least in part on the parallel components and the perpendicular components;

means for detecting an object present in the scene based at least in part on the range map and an airlight scattering polarization component; and means for outputting an indication of the object based at least in part on the detection of the object.

24. The apparatus of claim 23, wherein the means for translating the polarization parameters associated with the at least three polarization angles further comprises:

means for creating a composite image from the at least three polarization angles, wherein each pixel of the composite image contains polarization parameters for the pixel.

25. The apparatus of claim 23, further comprising:

means for calculating the polarization parameters for each polarization angle of each pixel of the image.

26. The apparatus of claim 23, wherein the means for translating polarization parameters associated with the at least three polarization angles to the reference angle further comprises:

means for calculating the polarization parameters from polarization data associated with the at least three polarization angles, wherein the polarization parameters include an angle-of-polarization and a degree-of-linear-polarization; and means for performing a vector dot product on the polarization parameters and the reference angle for every pixel of the at least three polarization angles of the image.

27. The apparatus of claim 26, wherein the means for determining the range map further comprises:

means for bounding range values to a predetermined upper value and a predetermined lower value.

28. The apparatus of claim 23, wherein the airlight scattering polarization component comprises a strongest airlight scattering polarization component at a selected portion of the scene.

29. The apparatus of claim 28, wherein the means for determining the range map further comprises:

means for dividing the airlight scattering polarization component by a vector component of polarization having a least transmission value to generate a polarization vector component magnitude to airlight ratio; and means for modifying the range map with the polarization vector component magnitude to airlight ratio.

30. The apparatus of claim 23, wherein the polarization parameters for the pixel further comprises at least three linear polarization parameters for the pixel.

31. The apparatus of claim 23, wherein the indication of the object comprises location information related to the object.

32. The apparatus of claim 23, wherein the image is taken at a first time.

33. The apparatus of claim 32, wherein the range map is a first range map, the apparatus further comprising:

means for capturing a second image of the scene, the second image containing at least three second polarization angles, wherein the second image is taken at a second time;

means for determining a second range map based at least in part on the at least three second polarization angles of the second image of the scene;

means for detecting the object in the second range map;

means for comparing the second range map to the first range map; and means for determining whether a bearing of the object has changed between the first time and the second time, wherein the indication further comprises an intercept course warning.

34. A non-transitory computer-readable medium storing code for object detection, the code comprising instructions executable by a processor to:

capture an image of a scene, the image containing at least three polarization angles;

translate polarization parameters associated with the at least three polarization angles to a reference angle for each pixel of the at least three polarization angles to create a vector map;

resolve the vector map into parallel components and perpendicular components, wherein the parallel components are parallel to a plane of incidence of light in the scene and the perpendicular components are perpendicular to the plane of incidence;

determine a range map based at least in part on the parallel components and the perpendicular components;

detect an object present in the scene based at least in part on the range map and an airlight scattering polarization component; and output an indication of the object based at least in part on the detection of the object.

35. The non-transitory computer-readable medium of claim 34, wherein the instructions to translate the polarization parameters associated with the at least three polarization angles further are executable to:

create a composite image from the at least three polarization angles, wherein each pixel of the composite image contains polarization parameters for the pixel.

36. The non-transitory computer-readable medium of claim 34, wherein the instructions are further executable to:

calculate the polarization parameters for each pixel of the at least three polarization angles.

37. The non-transitory computer-readable medium of claim 34, wherein the instructions to translate polarization parameters associated with the at least three polarization angles to the reference angle further are executable to:

calculate the polarization parameters from polarization data associated with the at least three polarization angles, wherein the polarization parameters include an angle-of-polarization and a degree-of-linear-polarization; and perform a vector dot product on the polarization parameters and the reference angle for every pixel of the at least three polarization angles of the image.

38. The non-transitory computer-readable medium of claim 37, wherein the instructions to determine the range map further are executable to:

bound range values to a predetermined upper value and a predetermined lower value.

39. The non-transitory computer-readable medium of claim 34, wherein the airlight scattering polarization component comprises a strongest airlight scattering polarization component at a selected portion of the scene.

40. The non-transitory computer-readable medium of claim 39, wherein the instructions to determine the range map further are executable to:

divide the airlight scattering polarization component by a vector component of polarization having a least transmission value to generate a polarization vector component magnitude to airlight ratio; and modify the range map with the polarization vector component magnitude to airlight ratio.

41. The non-transitory computer-readable medium of claim 34, wherein the polarization parameters for the pixel further comprises at least three linear polarization parameters for the pixel.

42. The non-transitory computer-readable medium of claim 34, wherein the indication of the object comprises location information related to the object.

43. The non-transitory computer-readable medium of claim 34, wherein the image is taken at a first time.

44. The non-transitory computer-readable medium of claim 43, wherein the range map is a first range map, and the instructions are executable to:

capture a second image of the scene, the second image containing at least three second polarization angles, wherein the second image is taken at a second time;

determine a second range map based at least in part on the at least three second polarization angles of the scene;

detect the object in the second range map;

compare the second range map to the first range map; and determine whether a bearing of the object has changed between the first time and the second time, wherein the indication further comprises an intercept course warning.

* * * * *